United States Patent Office 2,697,824
Patented Dec. 21, 1954

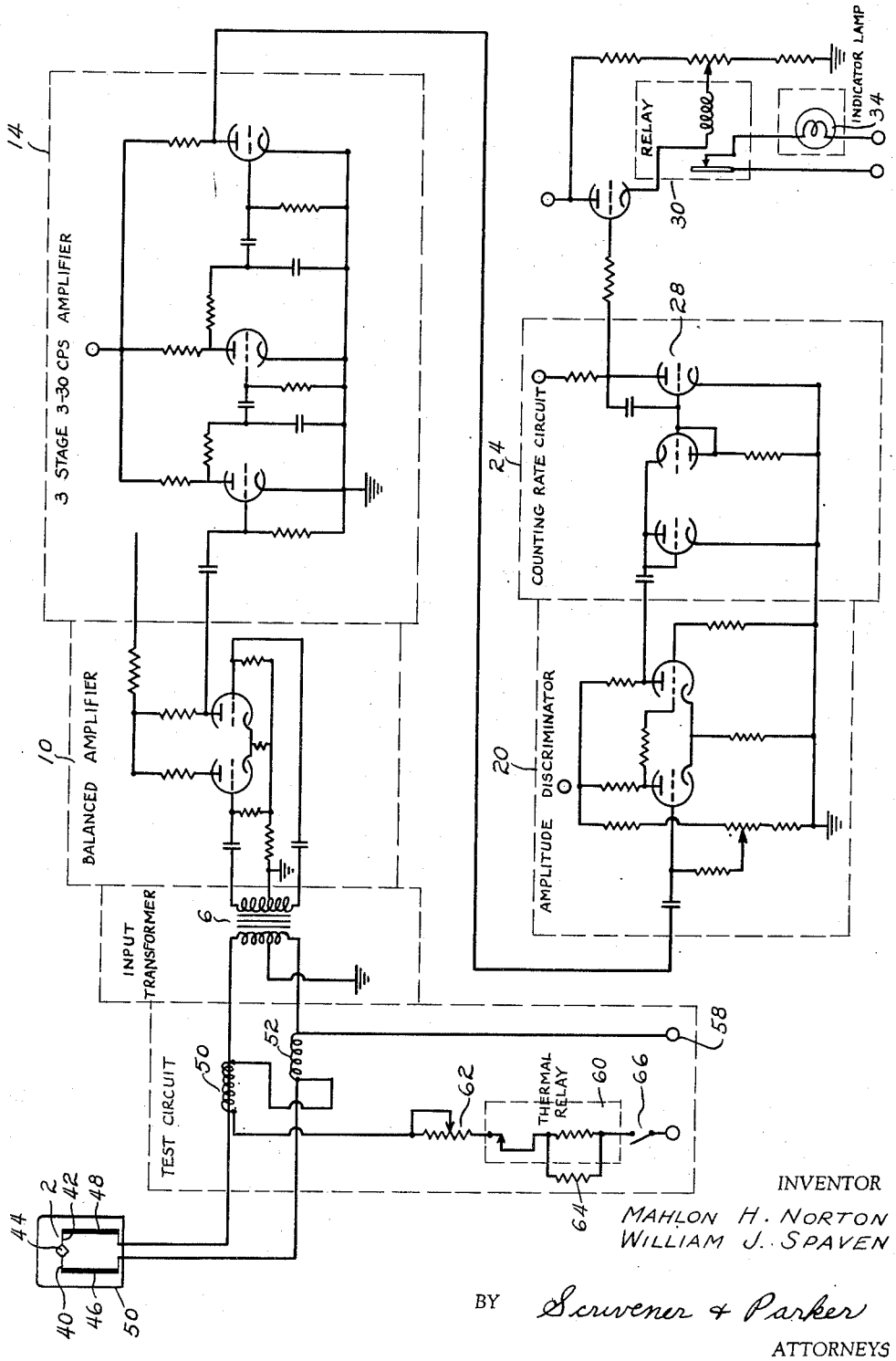

2,697,824
TEST CIRCUIT FOR FLAME DETECTOR SYSTEMS

Mahlon H. Norton, Paterson, and William J. Spaven, North Arlington, N. J., assignors to Petcar Research Corporation, Belleville, N. J., a corporation of New Jersey Application June 26, 1953, Serial No. 364,460

2 Claims. (Cl. 340—214)

This invention relates broadly to the art of fire detection and, more particularly, to the detection of the existence of infra-red radiation, for example that produced by a flame, as opposed and in contrast to detection systems which are responsive to the existence of a pre-determined ambient temperature at the sensitive means of the system. Such detection systems as that to which the invention relates are known as "surveillance type" flame detector systems and may be so referred to in this application.

In the co-pending application of Carbauh and Spaven, Serial No. 351,632, there is disclosed a system for flame detection utilizing a radiation-type thermocouple which will detect and indicate the presence of a flame without being responsive to, or affected by, steady sources of infra-red radiation or elevated ambient temperatures, which will detect the presence of a flame occurring at a substantial distance from the sensitive element of the system and within a wide angular space, preferably 360°, surrounding the element, and which, after operation to indicate the presence of a flame, will automatically re-set itself after extinguishment of the flame to thereby indicate any succeeding flame.

The present invention has to do with flame detecting systems such as that disclosed in the co-pending application referred to and has had for its principal object to provide a means for testing such a system to provide an indication that it is fully operable in its intended manner.

A preferred means provided by this invention for achieving these objects is described in the following specification and illustrated in the single figure of the annexed drawings.

It has been found that the great majority of "unfriendly" flames, which are those requiring detection, have predominant flicker components with the 3 to 30 C. P. S. range and therefore emit infra-red radiations modulated at a frequency within this range. In flame-detecting systems to which this invention relates the infra-red emissions of a flame having flicker components lying within that range are utilized to operate a thermocouple of special construction and operation which receives and immediately dissipates the heat due to each separate pulse of infra-red radiation independent of ambient temperature, thereby producing a pulse of current for each pulse of infra-red radiation. The voltages so produced are amplified and supplied to an amplitude discriminator circuit which produces a voltage pulse when the amplified output of the thermocouple exceeds a pre-determined level. A counting rate circuit is connected to the output of the discriminator circuit and counts the rate at which pulses are produced. The output of the counting rate circuit is amplified and fed to a relay which operates an indicating device.

A flame detector system including test means according to this invention is shown in circuit diagram in the drawings and comprises a thermocouple 2 of special form, construction and operation and which is described fully hereinafter. This thermocouple receives infra-red radiations from a source, such as a flame, causing a pulse of voltage to be developed for each flicker of the source.

Voltage pulses produced by the thermocouple must be amplified and means must be provided to distinguish the signal from spurious responses due to hum, pick-up and the like, and sufficient power must be developed to actuate the warning device. The fluctuating signal voltage output of the sensing device is accordingly supplied to the primary winding of a low frequency transformer 6 having a low frequency response of the order of 1.0 C. P. S., the secondary winding of which is connected to a balanced input amplifier stage 10 the output of which is supplied to a high-gain amplifier 14 consisting preferably of three cascaded stages of resistance-coupled amplifiers having a band pass of 3 to 30 C. P. S. Four-terminal resistor-capacitor coupling networks is employed to introduce the required frequency response. A slight rise in response is introduced to compensate for the fall-off of response of the thermocouple at the higher frequencies. The amplifier has an approximate gain of 6,000,000 at its mid-band frequency.

To minimize the effect of inherent circuit noise in the amplifier, an amplitude discriminator 20 is introduced at the output of the amplifier. The amplitude discriminator is a cathode-coupled bi-stable multi-vibrator. When the input voltage to the discriminator exceeds a predetermined voltage level, which can be determined by adjusting a grid bias control, the multi-vibrator changes from one stable state to the other, returning to the first state only when the input voltage is reduced below a selected level. Output voltages are produced having a measured amplitude of 80 volts peak to peak. The bias control is set so that inherent circuit noise does not exceed the predetermined level, while the voltage developed due to the presence of a flame exceeds the predetermined level causing a pulse to be developed. Thus the effects of inherent circuit noise and low-level spurious voltages are minimized.

The output waveform from the amplitude discriminator is coupled to a diode counting-rate circuit 24. A differentiating network causes the square waveforms to be changed to narrow pulses of constant width and amplitude since the RC time constant is relatively small. These pulses charge a Miller-type integrator which has a high resistance in shunt. When the rate of occurrence of pulses is low, the charge on the capacitor leaks off; however, when the pulse rate is increased the charge on the capacitor does not leak off causing a D. C. voltage to be developed, the amplitude of which is directly proportional to the applied pulse rate. In this manner the effect of low frequency spurious responses are minimized.

The output of the counting-rate circuit is coupled through a cathode follower 28 to a relay 30. As the voltage output of the counting rate circuit is a function of frequency, the relay is adjusted to operate at a pre-determined voltage which corresponds to a counting rate of 3 C. P. S. Operation of the relay connects an indicating device 34, such as a lamp, to a source of voltage to energize the indicating device.

The sensing element forming part of the described system comprises at least one thermocouple consisting of two wires 40, 42 formed of different metals and connected at their adjacent ends, as by welding, to a target plate 44. As the thermocouple must respond to flame flicker in the range of 3 to 30 C. P. S. the wires 40, 42 and the target plate 44 are made sufficiently small that they will not retain heat due to infra-red radiation from a detected flame, which retention would cause them to arrive at an average temperature, but will lose heat sufficiently rapidly that their temperature will be intermittently increased at the rate of flame flicker. The outer end of each of the thermocouple wires 40, 42 is connected, as by welding, to supporting wires 46, 48, which are formed of a material having high thermal conductivity, such as copper, and which have thermal mass greatly in excess of that of the thermocouple assembly of wires and target plate, thereby permitting the thermocouple assembly to respond to modulated infra-red radiation independent of ambient temperatures. One or both faces of the target plate may be blackened in accordance with known practice in order to increase response. The thermocouple is sealed in an envelope or housing 50 formed of transparent material such as quartz glass and the envelope is evacuated to approximately 10 microns to increase frequency response.

A thermocouple having two wires respectively formed of constantan and Chromel-P each 0.0008 inch in diameter and having a rectangular platinum target plate 1 mm. x 1 mm. on each side and 0.0001 inch thick will be found to dissipate heat sufficiently rapidly to permit response in the 3 to 30 C. P. S. range. Other dimensions and materials may be successfully used but must be selected to permit dissipation of heat sufficiently rapidly to cause response of the thermocouple to each pulse of infra-red radiation due to flame flicker.

The system and thermocouple described hereinbefore are fully described and claimed in the application of Carbauh and Spaven which is referred to hereinbefore and form no part of the present invention.

By the present invention we have provided means for testing the described system in order to determine whether it is operative in the intended manner to indicate the presence of flame. Such means comprise coils 50 and 52 which are coupled respectively to the leads 54, 56 from the thermocouple sensing element to the primary winding of the transformer 6. The two coils are connected to a source of direct current 58 through a thermal time delay relay device 60, a network of current level set resistors 62, 64 and a normally open test switch 66.

In the operation of the test circuit, the test switch 66 is closed and a pulsating direct current is passed through the coils 50, 52 causing a signal to be developed in the transformer primary provided the circuit including the thermocouple element and the transformer primary is continuous. The operation of the conventional thermal relay 60 will cause the steady direct current of the source 58 to appear in coils 50, 52 and the thermocouple circuit as a pulsating direct current. The circuit is adjusted to cause pulsation in the 3 to 30 C. P. S. range to which the high gain amplifier is adjusted and when a signal pulsing in this range is applied to the primary of transformer the effect is the same as that due to normal operation of the system when the thermocouple is subjected to a flickering source of light and the indicator will therefore be operated to indicate that the entire system is in operative condition.

What is claimed is:

1. A test circuit for a surveillance type flame detector system of the type which is operable to provide an indication in response to an intermittent source of infra-red radiation such as a flame and which comprises at least one thermocouple of such small mass that the parts thereof dissipate heat sufficiently rapidly to permit thermocouple response in the range of 3 to 30 C. P. S., a transformer, leads connecting said thermocouple to the terminals of the primary windings of said transformer, means connected to the secondary winding of said transformer for amplifying the output of the thermocouple, means for counting the number of times the amplified thermocouple voltage exceeds a pre-determined value per unit time and for producing a voltage proportional to such frequency, indicating means, and means operable by a pre-determined voltage produced by the counting means to operate said indicating means, said test circuit comprising means connected to the output of said thermocouple and operable when said thermocouple is de-energized to supply to said amplifying means direct current pulsating in the range of 3 to 30 C. P. S. to cause operation of said indicating means in simulation of the operation of said indicating means by said thermocouple.

2. A test circuit for a surveillance type flame detector system of the type which is operable to provide an indication in response to an intermittent source of infra-red radiation such as a flame and which comprises at least one thermocouple of such small mass that the parts thereof dissipate heat sufficiently rapidly to permit thermocouple response in the range of 3 to 30 C. P. S., a transformer, leads connecting said thermocouple to the terminals of the primary winding of said transformer, means connected to the secondary winding of said transformer for amplifying the output of the thermocouple, means for counting the number of times the amplified thermocouple voltage exceeds a pre-determined value per unit time and for producing a voltage proportional to such frequency, indicating means, and means operable by a pre-determined voltage produced by the counting means to operate said indicating means, said test circuit comprising a source of direct current, means for producing from said direct current a direct current pulsating in the range of 3 to 30 C. P. S., and means inductively coupled to said leads for supplying said pulsating direct current to said leads to cause operation of said indicating means in simulation of the operation of said indicating means by said thermocouple.

References Cited in the file of this patent
UNITED STATES PATENTS

| Number | Name | Date |
|---|---|---|
| 2,455,351 | Beam et al. | Dec. 7, 1948 |
| 2,473,940 | Clark | June 21, 1949 |
| 2,507,359 | Weisz | May 9, 1950 |